Dec. 11, 1945.  F. W. BLANCHARD  2,390,866

POSITION-INDICATING HANDLE FOR VALVES

Filed June 30, 1943

INVENTOR
F. W. BLANCHARD
BY Fetherstonhaugh &Co.
ATTORNEYS

Patented Dec. 11, 1945

2,390,866

UNITED STATES PATENT OFFICE 2,390,866

POSITION-INDICATING HANDLE FOR VALVES

Frederick W. Blanchard, Hampstead, Quebec, Canada

Application June 30, 1943, Serial No. 492,876

5 Claims. (Cl. 116—125)

This invention relates to valves and the object is to provide improved means for mounting a position-indicating handle on a valve stem so that the setting of the handle may be changed to compensate for unavoidable variations in the distance travelled by the valve stem in moving the valve from its fully closed to its fully open position, and vice versa, such variations being due to wear and necessary valve-grinding or machining operations.

The invention consists, essentially, in the provision of resettable means whereby a position-indicating handle may be permutatively assembled with a valve stem so that the handle has a large number of possible circular permutations which permit it to be selectively reset on the valve stem to compensate, with a satisfactory degree of accuracy, for considerable variations in the travel of the stem due to wear or other causes.

More particularly, the invention comprises a torque-transmitting member interposed between a valve stem and a position-indicating handle in interfitting torque-transmitting engagement therewith, the angular setting of said member with reference to the valve stem and the angular setting of the handle with reference to said member being variable by selective permutative reassembly of the torque-transmitting member and handle with reference to each other and with reference to said stem.

The torque-transmitting member referred to in the preceding paragraph may comprise a sleeve having a polygonal bore in which a complementary polygonal portion of the valve stem is removably and interchangeably fitted to provide a positive torque-transmitting connection between the sleeve and stem, the outer surface of said sleeve being also a polygon which is removably and interchangeably fitted in a complementary polygonal opening provided in the position-indicating handle so that the sleeve and handle are also in positive torque-transmitting engagement with each other. In this embodiment of the invention it is preferred that all the polygons referred to be "regular" and that the engaging polygonal portions of the stem and torque-transmitting member have either a greater or lesser number of sides as compared with the engaging polygonal portions of the torque-transmitting member and handle. It may also be noted here that a more accurate resetting of the handle to compensate for considerable variations in the travel of the valve stem is possible if the torque-transmitting member is shaped so that only one of its two polygonal surfaces has an even number of sides.

The torque-transmitting member may also take other forms such, for example, as a washer having each of two opposite sides thereof provided with a circular row of radially arranged teeth, the teeth of one row being interchangeably disposed in interfitting torque-transmitting engagement with an equal number of similarly arranged teeth carried by the valve stem on which the washer is removably and interchangeably fitted, the remaining teeth carried by the washer being interchangeably disposed in interfitting torque-transmitting engagement with an equal number of similarly arranged teeth carried by the handle member which is provided with a shaft receiving opening in line with the shaft receiving opening of the washer.

When the washer-type torque-transmitting member is used, it is preferred that only one of the two rows of washer teeth be composed of an equal number of teeth since this provides for a more accurate fractional permutative adjustment of the handle around the valve stem.

In both of the arrangements described above the handle and the torque-transmitting member are secured in place on the valve stem by means of a clamping nut carried by said stem.

Proceeding now to a more detailed description of this invention reference will be had to the accompanying drawing, wherein—

Figure 1:
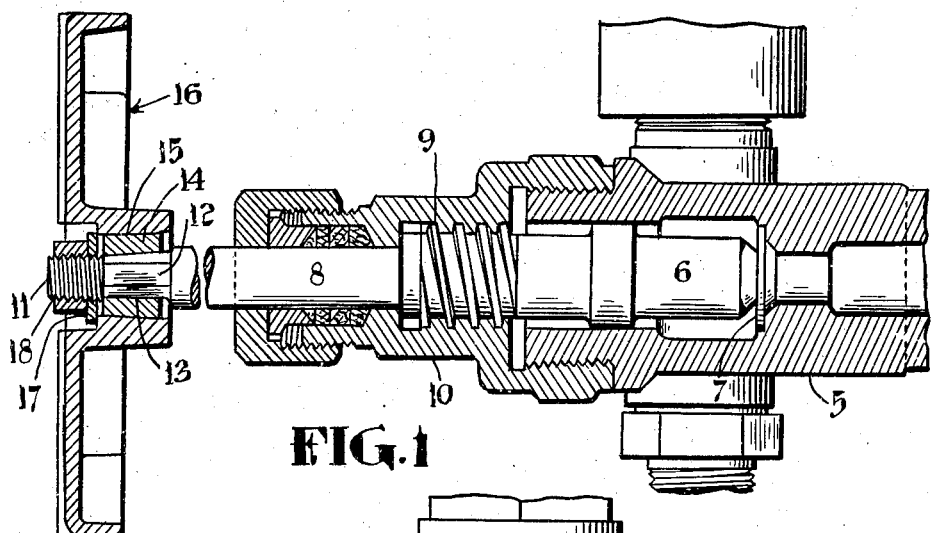
Fig. 1 is a longitudinal sectional view of a valve equipped with a position-indicating handle mounted in accordance with my invention.
Figures 2, 3:
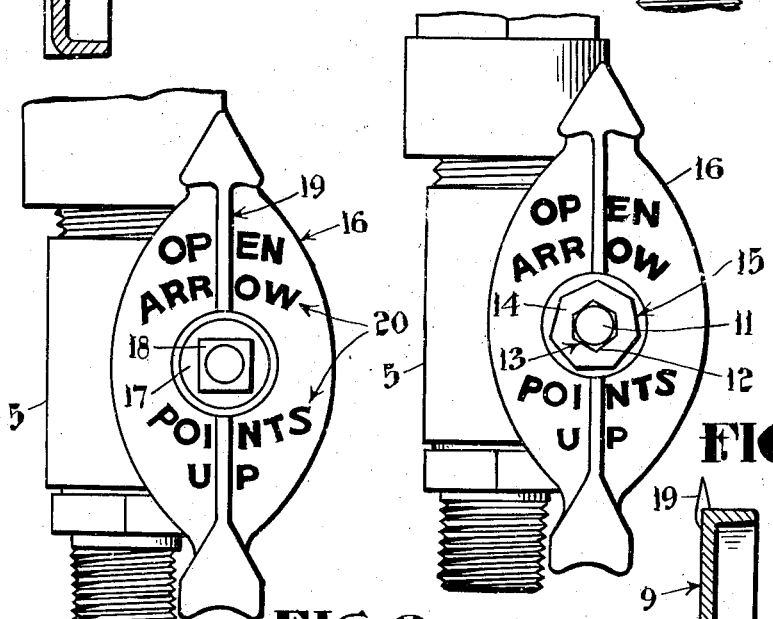
Fig. 2 is a front view of the valve and handle assembly and shows the correct position of the handle when the valve is fully opened.
Fig. 3 is a view similar to Fig. 2 but with the handle-retaining nut and washer removed to show the manner in which the polygonal portions of the stem, torque-transmitting member and handle are assembled in positive torque-transmitting engagement with each other.

In the arrangement shown in Figs. 1 to 3 inclusive, 5 designates a valve casing containing a valve 6 adapted to close against seat 7, said valve being carried by the inner end of a rotary and axially movable stem 8 having a portion 9 thereof in screw threaded engagement with a complementary threaded portion of the valve bonnet 10. The stem 8 is formed with a cylindrical screw threaded outer end 11 and an adjacent hexagonal torque-transmitting portion 12, the latter being fitted in the complementary hexagonal bore 13 of a torque-transmitting sleeve 14. The outer surface of sleeve 14 is also a polygon, being here shown as a heptagon which is fitted in a complementary heptagonal opening 15 provided in the position-indicating handle 16. The sleeve 14 and the sleeve-engaging polygonal portions of stem 8 and handle 16 are longitudinally tapered as shown in Fig. 1 so that these parts may be held together in wedging engagement by means of the handle engaging washer 17 and clamping nut 18 which are fitted on the threaded end 11 of the stem.

The handle 16 is provided with a position-indicating arrow 19 and with raised lettering 20 indicating that the point of the arrow should be directed upwardly when the valve is in its fully opened position.

The engaging polygonal portions of the stem 8 and sleeve 14 may have any desired number of sides and this is also true of the engaging polygonal portions of sleeve 14 and handle 16. However, the best results are obtained when the sleeve is formed so that only one of the two sleeve polygons has an even number of sides.

When the lineal and angular distance through which the valve stem 8 is moved in operating the valve 6 from its fully closed to its fully opened position, and vice versa, is varied by wear or as the result of valve grinding or machining operations or variations in the position of valve bonnet 10 it becomes necessary to reset the position-indicating handle on the valve stem in order to obtain accurate position indication. According to the present invention this resetting of the handle is accomplished permutatively by the successive acts of changing the angular setting of said sleeve with reference to the valve stem and the angular setting of the handle with reference to said sleeve, this being accomplished by removing the sleeve and handle from the stem and then reassembling these three parts in different positions of relative angular displacement. An unskilled workman can accomplish this by first arranging the handle in a vertical position on or in front of the polygonal portion of the valve stem with the point of the position-indicating arrow directed upwardly and then rotating the sleeve in front of the handle until a position is reached where it can be seen that the sleeve will fit between the stem and the handle to mount the latter in said prearranged vertical position.

Figures 4, 5:
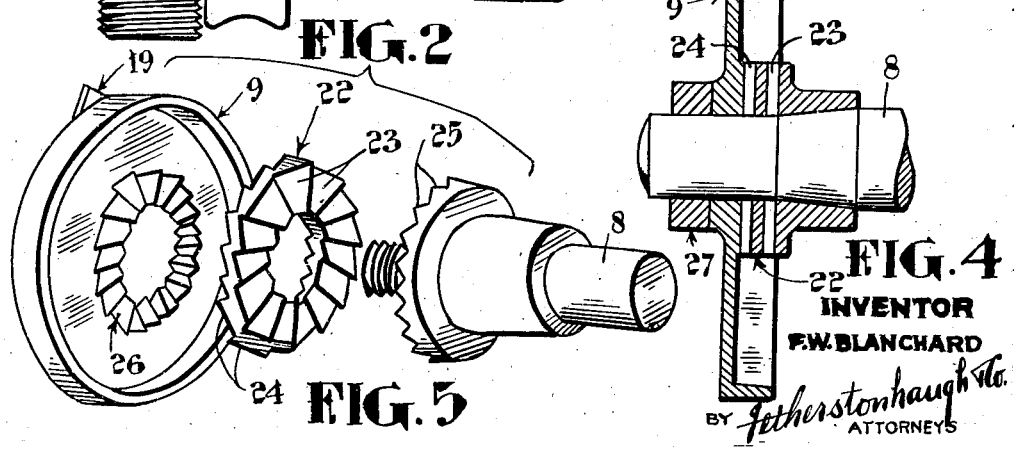
Fig. 4 is a longitudinal sectional view of a modified arrangement in which a washer-type torque transmitting member is interposed between the valve stem and the handle.
Fig. 5 is a perspective view showing the valve stem torque transmitting washer and handle in separated relation.

In the modified arrangement shown in Figs. 4 and 5 the torque-transmitting member interposed between the stem 8 and the position-indicating handle 9 comprises a washer 22 provided with two circular rows of oppositely facing radial teeth 23 and 24, the teeth 23 being disposed in interchangeable interfitting torque-transmitting engagement with a circular row of similar teeth 25 carried by a hub on the stem 8 and the teeth 24 being disposed in interchangeable interfitting engagement with a circular row of similarly arranged teeth 26 carried by the position-indicating handle 9; the stem, torque-transmitting member and handle being secured together in interfitting relation by means of a clamping nut 27 threaded onto the free end of the stem. In this arrangement it is preferred that only one of the two rows of teeth carried by the washer 22 be composed of an even number of teeth.

Having thus described my invention, what I claim is:

1. The combination with a valve stem and a position-indicating handle of permutation means for resettably mounting said handle on said stem so that the handle has a large number of possible circular permutations enabling it to be selectively reset on the stem to compensate for variations in the travel of the stem due to wear or other causes, said means comprising an angularly resettable torque-transmitting member interposed between said stem and handle and provided with torque-transmitting parts adapted to be selectively and permutatively assembled in interfitting engagement with cooperating torque-transmitting parts of the stem and handle, the interfitting torque-transmitting parts of the stem, handle and member being arranged in endless series around the central axis of the stem.

2. The combination with a valve stem and a position-indicating handle of permutation means for resettably mounting said handle on said stem, said means comprising a sleeve provided with inner and outer polygonal surfaces disposed in torque-transmitting engagement with complementary polygonal surfaces of said stem and handle.

3. The combination set forth in claim 2, in which one of the polygonal surfaces of said sleeve contains less sides than the other.

4. The combination set forth in claim 2, in which only one of the polygonal surfaces of said sleeve comprises an even number of sides.

5. The combination with a valve stem and a position-indicating handle of permutation means for resettably mounting said handle on said stem, said means comprising a washer provided with two circular rows of oppositely facing radial teeth, the teeth of one row being disposed in interchangeable, interfitting torque-transmitting engagement with a circular row of similar teeth carried by said stem and the teeth of the remaining row being disposed in interchangeable, interfitting engagement with a circular row of similarly arranged teeth carried by the position-indicating handle.

FREDERICK W. BLANCHARD.